(12) United States Patent
Panthri

(10) Patent No.: US 12,441,231 B2
(45) Date of Patent: Oct. 14, 2025

(54) SYSTEMS AND METHODS FOR EXTENDING SENSOR AND LIGHTING COVERAGE BETWEEN VEHICLES

(71) Applicant: Toyota Motor Engineering & Manufacturing North America, Inc., Plano, TX (US)

(72) Inventor: Shaurya Panthri, Ann Arbor, MI (US)

(73) Assignees: Toyota Motor Engineering & Manufacturing North America, Inc., Plano, TX (US); Toyota Jidosha Kabushiki Kaisha, Toyota (JP)

( * ) Notice: Subject to any disclaimer, the term of this patent is extended or adjusted under 35 U.S.C. 154(b) by 152 days.

(21) Appl. No.: 18/517,636

(22) Filed: Nov. 22, 2023

(65) Prior Publication Data

US 2025/0162492 A1   May 22, 2025

(51) Int. Cl.
*B60Q 1/08* (2006.01)
*B60Q 9/00* (2006.01)
*B60W 30/06* (2006.01)
*B60W 30/165* (2020.01)
*B60W 60/00* (2020.01)

(52) U.S. Cl.
CPC ............... *B60Q 1/085* (2013.01); *B60Q 9/00* (2013.01); *B60W 30/06* (2013.01); *B60W 30/165* (2013.01); *B60W 60/001* (2020.02); *B60Q 2300/20* (2013.01); *B60Q 2300/312* (2013.01); *B60W 2554/404* (2020.02); *B60W 2555/20* (2020.02)

(58) Field of Classification Search
CPC ...... B60Q 1/085; B60Q 9/00; B60Q 2300/20; B60Q 2300/312; B60W 30/06; B60W 30/165; B60W 60/001; B60W 2554/404; B60W 2555/20
See application file for complete search history.

(56) References Cited

U.S. PATENT DOCUMENTS

| | | |
|---|---|---|
| 10,967,833 B1 | 4/2021 | Nagao et al. |
| 11,002,827 B2 | 5/2021 | Blanco et al. |
| 11,021,133 B2 | 6/2021 | Lu et al. |
| 11,138,886 B1 | 10/2021 | Ricke et al. |
| 11,320,829 B2 | 5/2022 | Ekin |

(Continued)

FOREIGN PATENT DOCUMENTS

| | | |
|---|---|---|
| JP | WO2015056530 A1 | 3/2017 |
| KR | 20160056054 A | 5/2016 |
| WO | 2017176550 A1 | 10/2017 |

*Primary Examiner* — Abby Lin
*Assistant Examiner* — Danielle M Jackson
(74) *Attorney, Agent, or Firm* — Christopher G. Darrow; Darrow Mustafa PC

(57) ABSTRACT

System, methods, and other embodiments described herein relate to improving the sensing and lighting coverage of a first vehicle using a second vehicle. In one embodiment, a method includes determining at least one of a sensor coverage and a lighting coverage of a first vehicle and a second vehicle. The method further includes controlling the second vehicle to park in a position that maximizes the at least one of the sensor coverage and the lighting coverage between the first vehicle and the second vehicle while the first vehicle is stationary. Moreover, the method includes activating at least one of sensors and lighting mechanisms of the first vehicle and the second vehicle.

20 Claims, 6 Drawing Sheets

(56) References Cited

U.S. PATENT DOCUMENTS

| | | |
|---|---|---|
| 11,325,524 B2 | 5/2022 | Martin et al. |
| 11,417,214 B2 | 8/2022 | Murray et al. |
| 2010/0091514 A1* | 4/2010 | Albou .................... B60Q 1/143 |
| | | 362/538 |
| 2018/0218582 A1 | 8/2018 | Hodge et al. |
| 2019/0016255 A1* | 1/2019 | Damon ................... F21S 43/13 |
| 2021/0354689 A1* | 11/2021 | Schreiber ............. G01S 13/867 |

\* cited by examiner

SYSTEMS AND METHODS FOR EXTENDING SENSOR AND LIGHTING COVERAGE BETWEEN VEHICLES

TECHNICAL FIELD

The subject matter described herein relates, in general, to improving sensor and lighting coverage of a vehicle and, more particularly, to extending sensor and/or lighting coverage of a first vehicle by controlling a second vehicle.

BACKGROUND

When authorized vehicle users leave a vehicle, the vehicle becomes prone to theft and damage, and the users become prone to losing the vehicle, becoming lost, and/or encountering difficulties returning to their vehicle. Vehicle sensors can be used to monitor the surroundings of a vehicle while an authorized user of the vehicle, such as a driver, passenger, etc., is away from the vehicle. However, vehicle sensors are only capable of collecting sensor data for the areas that are reachable by the vehicle sensors. Accordingly, when relevant information, such as safety risks, third parties, etc., exists outside of the range of the vehicle sensors, the vehicle is unable to detect the information. This may lead to an authorized user encountering dangers when they return to their vehicle, to unauthorized users damaging, stealing, or otherwise interacting with the vehicle, and so on.

Additionally, when an authorized user attempts to return to their vehicle, it may be difficult to find/see the vehicle and/or difficult to navigate to their vehicle, especially in poor visibility areas. Current methods to increase visibility include the use of lighting mechanisms external to the vehicle (e.g., lighting mechanisms located on infrastructure), the use of remote start technologies which allows the vehicle to turn on and activate lights, and so on. However, the use of external vehicle lights does not highlight the vehicle of the authorized user in a manner that is distinguishing from other vehicles in the vicinity. Further, even where the vehicle can be controlled to activate lights, the lights may not provide enough visibility for the user to notice their vehicle and/or for the user to have a well-lit environment surrounding their vehicle. As such, the current methods may result in users feeling anxious, feeling unsafe, becoming injured, and so on.

SUMMARY

In one embodiment, a system is disclosed. The system includes a processor and a memory communicably coupled to the processor. The memory stores instructions that, when executed by the processor, cause the processor to determine at least one of a sensor coverage and a lighting coverage of a first vehicle and a second vehicle. The instructions further include instructions that, when executed by the processor, cause the processor to control the second vehicle to park in a position that maximizes the at least one of the sensor coverage and the lighting coverage between the first vehicle and the second vehicle while the first vehicle is stationary. Moreover, the instructions include instructions that, when executed by the processor, cause the processor to activate at least one of sensors and lighting mechanisms of the first vehicle and the second vehicle.

In another embodiment, a non-transitory computer-readable medium includes instructions that, when executed by a processor, cause the processor to determine at least one of a sensor coverage and a lighting coverage of a first vehicle and a second vehicle. The instructions further include instructions that, when executed by the processor, cause the processor to control the second vehicle to park in a position that maximizes the at least one of the sensor coverage and the lighting coverage between the first vehicle and the second vehicle while the first vehicle is stationary. Moreover, the instructions include instructions that, when executed by the processor, cause the processor to activate at least one of sensors and lighting mechanisms of the first vehicle and the second vehicle.

In yet another embodiment, a method is disclosed that includes determining at least one of a sensor coverage and a lighting coverage of a first vehicle and a second vehicle. The method further includes controlling the second vehicle to park in a position that maximizes the at least one of the sensor coverage and the lighting coverage between the first vehicle and the second vehicle while the first vehicle is stationary. Moreover, the method includes activating at least one of sensors and lighting mechanisms of the first vehicle and the second vehicle.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Figure 1:
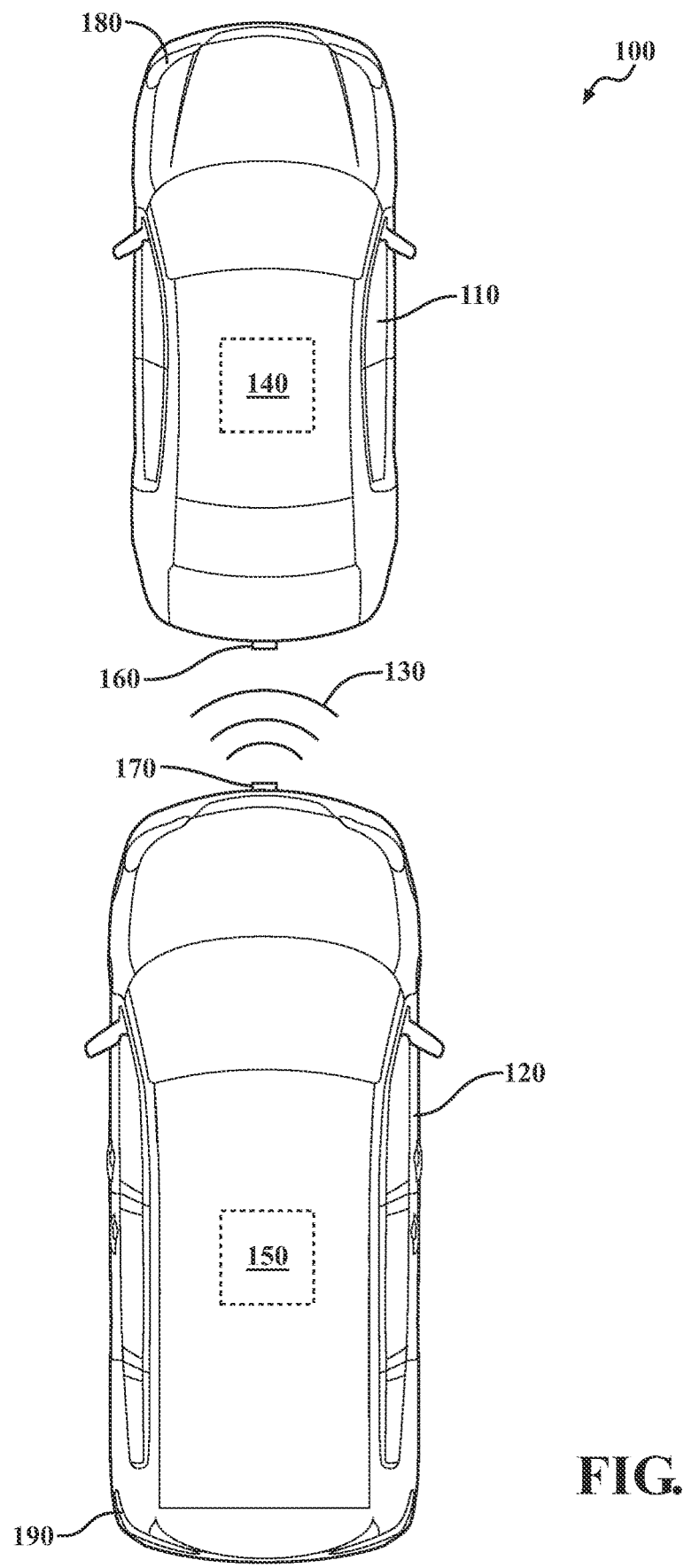
FIG. 1 illustrates one embodiment of a lead vehicle and a following vehicle connected in a hitchless towing configuration.

Systems, methods, and other embodiments associated with improving the sensor/lighting coverage of a first vehicle using a second vehicle are disclosed herein. As previously discussed, when vehicles are left unsupervised, authorized users of the vehicles may face challenges, such as inadequate surveillance of vehicle surroundings, difficulties locating a vehicle, unaccounted for safety conditions in the vehicle surroundings, and so on. Current methods to provide surveillance of the vehicle restrict surveillance to the areas that are detectable by onboard vehicle sensors which may lead to inadequate sensor coverage, vehicle/user damage, etc. Further, current methods to improve the visibility of a vehicle may not provide enough light for a user to safely traverse a path to their vehicle and/or may not provide lighting in a manner that allows the user to distinguish their vehicle from other nearby vehicles and structures.

Therefore, in one embodiment, a system that improves sensing/lighting coverage for a first vehicle by controlling a second vehicle is disclosed. In one aspect, the first vehicle and the second vehicle are vehicles that are wirelessly connected to one another, such as in a hitchless towing configuration, such as described in U.S. Pat. App. Pub. No 2023/0236593, which is hereby incorporated by reference in its entirety. As such, in one embodiment, the second vehicle is configured to autonomously follow the first vehicle. The second vehicle can be controlled to follow the first vehicle by receiving instructions from the first vehicle, by following the first vehicle using sensors, by processing sensor data captured by the first vehicle to determine appropriate maneuvers to execute, or by any other suitable method. In one arrangement, the first and second vehicles are further configured to share data with one another via a wireless connection. As such, the system, in one configuration, determines a sensor and/or lighting coverage of the first and second vehicles by analyzing the shared data. A sensor coverage includes, for example, a range surrounding the first/second vehicle that is scannable by the sensors of the first/second vehicle. A lighting coverage is, for example, an area surrounding the first/second vehicle that is reachable by lighting mechanisms of the first/second vehicle. The system may determine the sensor and/or lighting coverage of the vehicles based on acquired sensor data of the sensors, measurable outputs of the vehicle lights, and/or by using a lookup table associated with the available sensor/lighting coverages of the vehicles.

In any case, responsive to identifying the sensor/lighting coverage of the vehicles, the system controls the second vehicle to park in a position that maximizes the sensor and/or lighting coverage between the first vehicle and the second vehicle while the first vehicle is stationary. A position that maximizes the sensor and/or lighting coverage is, in one embodiment, a position that allows the vehicles to have no overlap in sensor/lighting coverage. For example, after the vehicles initially park, the system determines whether the vehicles are parked in a manner that maximizes sensor/lighting coverage and subsequently controls the second vehicle to maneuver to a position that maximizes sensor/lighting coverage when the vehicles are not already maximizing the coverage between the vehicles. In one approach, the position that maximizes sensor coverage is also the position that maximizes lighting coverage.

In one embodiment, the position that maximizes sensor coverage differs from the position that maximizes lighting coverage. Accordingly, where the position that maximizes sensing and lighting coverage differs, the system, in one approach, determines whether to maximize the sensing or lighting coverage of the vehicles. The system may determine whether to maximize the sensing or lighting coverage based on inputs of an authorized user, lighting conditions in the surroundings of the vehicle, potential for crime in the surroundings of the vehicle, learned behaviors of an authorized user, etc. For example, if it is daytime and the authorized user parks the vehicle in a high-crime rate area, the system controls the second vehicle to park in a manner that maximizes sensor coverage rather than lighting coverage. Further, in one configuration, the system may control the second vehicle to readjust the parking position when the system determines that it is desirable to maximize the other coverage type. As an example, if the second vehicle is originally parked in a manner that maximizes sensor coverage but since parking, the surroundings have gotten dark, and the authorized user is expected to return to the first vehicle within a threshold amount of time, the system controls the second vehicle to readjust its position to maximize lighting coverage.

In one or more arrangements, it may be difficult for the second vehicle to park at the distance that maximizes the sensor/lighting coverage between the vehicles. As an example, environmental conditions, such as obstacles (e.g., parked vehicles, pedestrians, curbs, potholes, construction zones, unsafe parking areas, etc.), weather conditions (e.g., ice, snow, puddles, etc.), parking restrictions (e.g., parking time limitations, authorized parking zones), etc., may prevent the second vehicle from parking in the position that maximizes the sensor/lighting coverage. Accordingly, in one embodiment, the system controls the second vehicle to park at a distance from the first vehicle that does not maximize the sensor/lighting coverage. For example, the system may control the second vehicle to park in the next-closest parking space or in a position that otherwise minimizes overlap between sensor/lighting coverages of the vehicles. In one arrangement, the system monitors the environmental condition that prevents the second vehicle from parking in the position that maximizes sensor/lighting coverage to determine whether the second vehicle can readjust its parking position to maximize the sensor/lighting coverage. Responsive to determining that the environmental condition satisfies a change threshold that is based, at least in part, on a status of the environmental condition, the system controls the second vehicle to park in the position that maximizes the sensor/lighting coverage. The change threshold is satisfied when, for example, the system determines that the status of the environmental condition corresponds to a removal of the obstacle (e.g., a parked vehicle leaves the parking space that allows the second vehicle to maximize sensor/lighting coverage), a change in the weather condition (e.g., removal of snow, ice, puddles, etc.), and a change in the parking restriction (e.g., a timing restriction is lifted).

In response to the system controlling the second vehicle to park in the position that maximizes sensor/lighting coverage, the system controls the vehicles to activate sensors/lighting mechanisms depending on whether the system parked the vehicle to maximize sensor coverage or lighting coverage. For example, where the system parks the vehicle to maximize sensor coverage, the system activates the sensors of both vehicles that allow for the highest level of coverage by the vehicles. As another example, where the system parks the second vehicle to maximize lighting coverage, the system activates the lighting mechanisms of both vehicles in a manner that allows for the most lighting coverage around the vehicles. Further, in response to parking the second vehicle at the position that maximizes lighting/sensor coverage, the system may control an external indicator of the first and/or second vehicle to output an indication of a connection between the vehicles to notify surrounding vehicles and users of the connectivity between the first and second vehicle. As an example, the first/second vehicle may output a beam of light between the vehicles, a projection, an external display, etc., that indicates the connection between vehicles so that other users do not interfere with the parking configuration of the vehicles.

In any case, responsive to parking the second vehicle in the position that maximizes sensor coverage, the system may first activate low resolution sensors of the vehicles to preserve battery power of the vehicles. Thereafter, responsive to identifying a trigger in the surroundings of the first/second vehicle, the system, in one arrangement, activates a set of high resolution sensors to provide a more detailed assessment of the surroundings. As an example, a trigger can include motion, suspicious behavior, changes in weather/environmental conditions, etc. If, for example, the environmental conditions in the surroundings of the vehicles change (e.g., a puddle forms around the vehicles, precipitation commences around the vehicles, a fire starts around the vehicles, etc.), the system may notify an authorized user about the change via a personal device of the user (e.g., a smartphone, smart watch, etc.) before the user returns to the vehicles. In this way, the user can prepare for any changes, increasing the overall safety of the user as the user approaches the vehicle(s).

Further, responsive to parking the second vehicle in the position that maximizes lighting coverage, the system may activate the lighting mechanisms of the vehicles using various configurations. In one approach, the system automatically activates the lighting mechanisms when the second vehicle parks. In another approach, the system activates the lighting mechanisms responsive to determining that an authorized user of the first/second vehicle satisfies a proximity threshold that is based, at least in part on a distance from the authorized user to the first/second vehicle. For example, the system may receive global positioning system (GPS) data/navigation data associated with the user, and responsive to the user being within a viewable range of the vehicles (e.g., ten feet away from the vehicles), the system activates the lighting mechanisms. In this way, the system improves sensor/lighting coverage of a first and second vehicle.

Referring to FIG. 1, an example of a hitchless towing configuration 100 is illustrated. The hitchless towing configuration includes a lead vehicle 110 and a following vehicle 120. The lead vehicle 110 and the following vehicle 120 can be vehicles with the same functionality as one another, where the lead vehicle 110 and the following vehicle 120 are fully functioning automobiles operable by human drivers. In one embodiment, the following vehicle 120 is a trailer, where the following vehicle 120 does not include all of the components of the lead vehicle 110 and where the following vehicle 120 cannot be controlled using a human driver. In any case, the lead vehicle 110 and the following vehicle 120 are connected via a wireless connection 130.

In one approach, the wireless connection 130 is established between the lead vehicle 110 and the following vehicle 120 using a handshake process. The wireless connection 130 can be established using a lead vehicle system 140 of the lead vehicle 110 and a following vehicle system 150 of the following vehicle 120. In one arrangement, the lead vehicle system 140 identifies a beacon transmitted from the following vehicle system 150. The lead vehicle system 140 recognizes the beacon and attempts to establish the wireless connection 130 by sending a secure message, including credentials of the lead vehicle 110 to the following vehicle 120. The wireless connection 130 is successfully established when the following vehicle system 150 receives the secure message from the lead vehicle system 140 and responds thereto with, for example, a session key or other information in support of a wireless communication link.

In response to establishing the wireless connection 130, the lead vehicle system 140 can send instructions to the following vehicle system 150. Instructions can include maneuvers (e.g., speed, acceleration, steering angle, etc.) for the following vehicle 120 to execute or a path of the lead vehicle 110. In any case, the instructions allow the following vehicle 120 to follow the lead vehicle 110 without any physical connection between the lead vehicle 110 and the following vehicle 120. In one configuration, the lead vehicle 110 and the following vehicle 120 include lead vehicle lights 160 and following vehicle lights 170. The lead vehicle lights 160 and the following vehicle lights 170 can include any external lights of the lead vehicle 110 and the following vehicle 120, such as headlights, brake lights, puddle lights, trim lights, light bars, and so on. The lead vehicle 110 and the following vehicle 120 may have the same number and configuration of lights or a different number and configuration of lights. As an example, the lead vehicle lights 160 may project farther/brighter than the following vehicle lights 170. As another example, the following vehicle lights 170 may include rear lights while the lead vehicle lights 160 include rear lights, headlights, and trim lights.

In one embodiment, the lead vehicle 110 and the following vehicle 120 include lead vehicle sensors 180 and following vehicle sensors 190, respectively. The lead vehicle sensors 180 and the following vehicle sensors 190 may be the same sensors, different sensors, or a combination thereof. Further, the lead vehicle sensors 180 and the following vehicle sensors 190 may have the same sensing capabilities or different sensing capabilities. For example, the lead vehicle sensors 180 may have a larger sensor coverage than the following vehicle sensors 190 (i.e., the lead vehicle sensors 180 may be able to scan a larger area surrounding the lead vehicle 110 than the following vehicle sensors 190 can scan around the following vehicle 120). Using the wireless connection 130, the lead vehicle system 140 and the following vehicle system 150 can share sensor data with one another. The sensor data can inform the vehicles about the position of the vehicles in relation to one another, obstacles on the path of travel, etc.

In one approach, the following vehicle 120 can follow the lead vehicle 110 using the sensor data. For example, the following vehicle sensors 190 can include imaging sensors for tracking the position and movement of the lead vehicle 110 in relation to the following vehicle 120. Based on the position and movement of the lead vehicle 110, the following vehicle system 150 can control the following vehicle 110 to follow the sensed path of the lead vehicle 120. In this way, the following vehicle 120 can follow the lead vehicle 110 if the wireless connection 130 is lost or obstructed.

Figure 2:
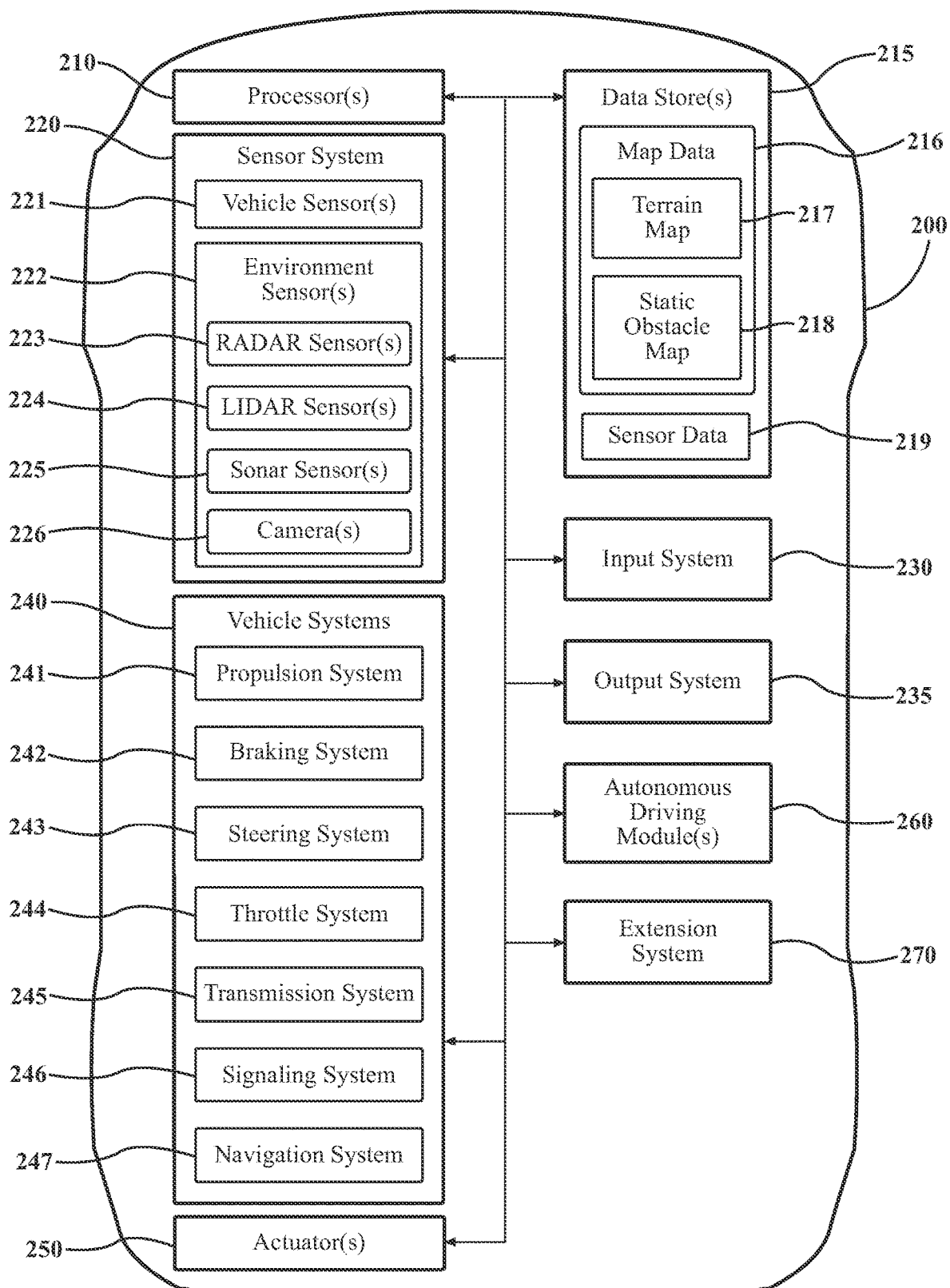
FIG. 2 illustrates one embodiment of a vehicle within which systems and methods disclosed herein may be implemented.

Referring to FIG. 2, a vehicle 200 is illustrated. As used herein, a "vehicle" is any form of motorized transport. In one or more implementations, the vehicle 200 is an automobile. While arrangements will be described herein with respect to automobiles, it will be understood that embodiments are not limited to automobiles. In some implementations, the vehicle 200 may be any robotic device or form of motorized transport that, for example, includes sensors to identify aspects of the surrounding environment and thus benefits from the functionality discussed herein associated with improving a sensor/lighting coverage of the vehicle 200. In one or more embodiments, the vehicle 200 is a lead vehicle (also referred to herein as "first vehicle") wirelessly connected to a following vehicle (also referred to herein as "second vehicle") in a hitchless towing configuration. Although the following discussion of the vehicle 200 will be from the perspective of the extension system 270 being implemented in a lead vehicle, it should be understood that, in one or more configurations, the extension system 270 can be implemented in the following vehicle. Although the following discussion of the vehicle 200 will be from the perspective of the extension system 270 being implemented in a lead vehicle, it should be understood that, in one or more configurations, the extension system 270 can be implemented in the following vehicle.

The vehicle 200 also includes various elements. It will be understood that in various embodiments, it may not be necessary for the vehicle 200 to have all of the elements shown in FIG. 2. The vehicle 200 can have any combination of the various elements shown in FIG. 2. Further, the vehicle 200 can have additional elements to those shown in FIG. 2. In some arrangements, the vehicle 200 may be implemented without one or more of the elements shown in FIG. 2. While the various elements are shown as being located within the vehicle 200 in FIG. 2, it will be understood that one or more of these elements can be located external to the vehicle 200. Further, the elements shown may be physically separated by large distances.

Some of the possible elements of the vehicle 200 are shown in FIG. 2 and will be described along with subsequent figures. However, a description of many of the elements in FIG. 2 will be provided after the discussion of FIGS. 3-6 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements. In either case, the vehicle 200 includes a extension system 270 that is implemented to perform methods and other functions as disclosed herein relating to improving the sensor/lighting coverage of the vehicle 200.

Figure 3:
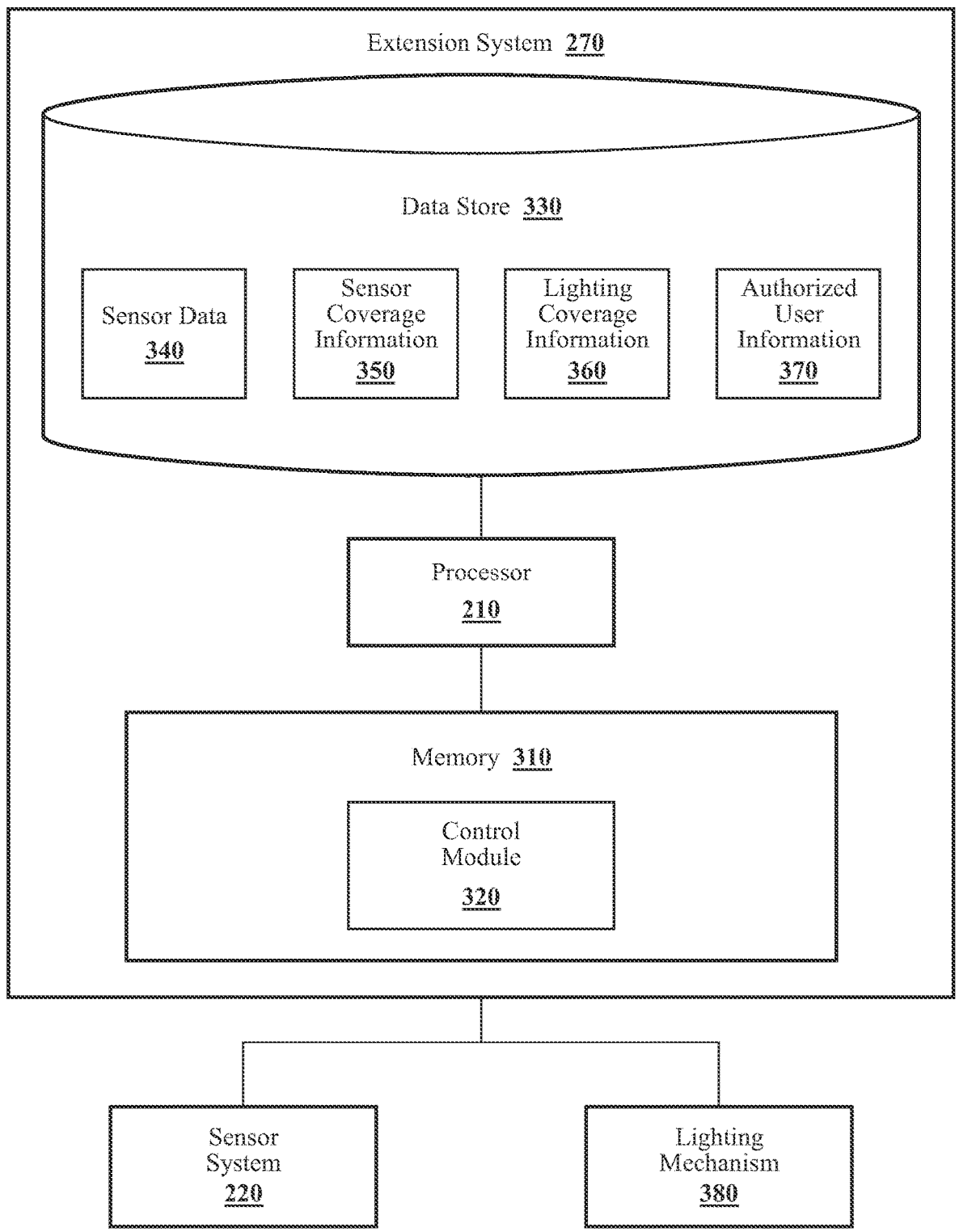
FIG. 3 illustrates one embodiment of an extension system that is associated with providing additional sensor and/or lighting coverage to a first vehicle using a second vehicle.

With reference to FIG. 3, one embodiment of the extension system 270 of FIG. 2 is further illustrated. The extension system 270 is shown as including one or more processor(s) 210 from the vehicle 200 of FIG. 2. Accordingly, the processor(s) 210 may be a part of the extension system 270, the extension system 270 may include a separate processor from the processor(s) 210 of the vehicle 200, or the extension system 270 may access the processor(s) 210 through a data bus or another communication path. In one embodiment, the extension system 270 includes a memory 310 that stores a control module 320. The memory 310 is a random-access memory (RAM), read-only memory (ROM), a hard-disk drive, a flash memory, or other suitable memory for storing the control module 320. The control module 320 is, for example, computer-readable instructions that, when executed by the processor(s) 210, cause the processor(s) 210 to perform the various functions disclosed herein.

With reference to FIG. 3, the control module 320 generally includes instructions that function to control the processor(s) 210 to receive data inputs from one or more sensors of the vehicle 200. The inputs are, in one embodiment, observations of one or more objects in an environment proximate to the vehicle 200 and/or other aspects about the surroundings. As provided for herein, the control module 320, in one embodiment, includes instructions that, when executed by the processor(s) 210, cause the processor(s) 210 to acquire sensor data 340 that includes at least camera images. In further arrangements, the control module acquires the sensor data 340 from further sensors, such as a radar sensor(s) 223, a LiDAR (light detection and ranging) sensor(s) 224, and other sensors as may be suitable for identifying objects in the surroundings of the vehicle 200.

Accordingly, the control module 320, in one embodiment, includes instructions that, when executed by the processor(s) 210, causes the processor(s) 210 to control the respective sensors to provide the data inputs in the form of the sensor data 340. Additionally, while the instructions of the control module 320 are discussed as causing the processor(s) 210 to control the various sensors to provide the sensor data 340, in one or more embodiments, the control module 320 can cause the processor(s) 210 to employ other techniques to acquire the sensor data 340 that are either active or passive. For example, the control module 320 may cause the processor(s) 210 to passively sniff the sensor data 340 from a stream of electronic information provided by the various sensors to further components within the vehicle 200. Moreover, the control module 320 may cause the processor(s) 210 to undertake various approaches to fuse data from multiple sensors when providing the sensor data 340 and/or from sensor data acquired over a wireless communication link. Thus, the sensor data 340, in one embodiment, represents a combination of perceptions acquired from multiple sensors.

In addition to objects in an environment proximate to the vehicle 200, the sensor data 340 may also include, for example, information about weather conditions in the environment of the vehicle 200 (e.g., information about precipitation, ice, snow, puddles, etc., in the environment of the vehicle 200), parking restrictions in the environment of the vehicle 200 (e.g., signs denoting parking time restrictions, unauthorized parking zones, etc.), and information about a following vehicle that the vehicle 200 connects to. Moreover, the control module 320, in one embodiment, causes the processor(s) 210 to control the sensors to acquire the sensor data 340 about an area that encompasses 360 degrees about the vehicle 200 in order to provide a comprehensive assessment of the surrounding environment. Of course, in alternative embodiments, the control module 320 may cause the processor(s) 210 to acquire the sensor data 340 about a forward direction alone when, for example, the vehicle 200 is not equipped with further sensors to include additional regions about the vehicle and/or the additional regions are not scanned due to other reasons.

In one approach, the control module 320 causes the processor(s) 210 to acquire the sensor data 340 from a following vehicle that is wirelessly connected to the vehicle 200. As previously discussed with reference to FIG. 1, the control module 320 causes the processor(s) 210 to receive sensor data from a following vehicle via the wireless connection between the vehicles. The sensor data 340 acquired from the following vehicle may include sensor data 340 encompassing an area not covered by the sensors of the vehicle 200 or an area that overlaps an area covered by the sensors of the vehicle 200. In one arrangement, the control module 320 causes the processor(s) 210 to control the following vehicle to park in a position that maximizes sensor coverage of the sensors of the vehicle 200 and the following vehicle. A position that maximizes sensor coverage is, for example, a position that allows the sensors of the vehicle 200 and the following vehicle to acquire as much information about the surroundings of the vehicle 200 and the following vehicle without sensors of the vehicle 200 and the following vehicle overlapping. As an example, the position may be a position directly across from and facing the vehicle 200, a position parallel to the vehicle 200, or the like. In any case, the sensor data 340 acquired from the following vehicle can include 3D point cloud data, camera images and/or video from the cameras of the following vehicle, radar measurements, and so on pertaining to the environment of the vehicle 200 and the following vehicle.

Moreover, in one embodiment, the extension system 270 includes a data store 330. In one embodiment, the data store 330 is a database. The database is, in one embodiment, an electronic data structure stored in the memory 310 or another data store and that is configured with routines that can be executed by the processor(s) 210 for analyzing stored data, providing stored data, organizing stored data, and so on. Thus, in one embodiment, the data store 330 stores data used by the control module 320 in executing various functions. In one embodiment, the data store 330 includes the sensor data 340 along with, for example, metadata that characterize various aspects of the sensor data 340. For example, the metadata can include location coordinates (e.g., longitude and latitude), relative map coordinates or tile identifiers, time/date stamps from when the sensor data 340 was generated, and so on.

In one embodiment, the data store 330 further includes sensor coverage information 350. The sensor coverage information 350 includes, for example, the sensor information associated with each sensor of the vehicle 200 and the following vehicle. The sensor information includes, in one embodiment, the type of sensor (e.g., camera, radar, LiDAR, ultrasound, etc.), the location of the sensor (e.g., on the roof of the vehicle 200, five inches above the center of the license plate of the vehicle 200, etc.), the direction the sensor is facing (e.g., in front of the vehicle 200, behind the vehicle 200, etc.), and the sensing range of the sensor (e.g., capable of sensing up to a distance of six feet long and two feet wide from the sensor). In one approach, the control module 320 causes the processor(s) to determine the sensor coverage information 350 based on the sensor data 340. For example, the control module 320 may cause the processor(s) 210 to determine the sensing range of a sensor by processing and analyzing the sensor data 340. In one arrangement, the control module 320 causes the processor(s) to determine the sensor coverage information 350 by utilizing a lookup table that is preconfigured by an original equipment manufacturer (OEM) when the vehicle 200 is originally provisioned and/or a lookup table that is developed based on manual inputs of a sensor supplier/authorized user of the vehicle 200/following vehicle.

In one embodiment, the data store 330 additionally includes lighting coverage information 360. In one arrangement, the lighting coverage information 360 includes information associated with the lights of vehicle 200 and/or the following vehicle. The information associated with the lights include, for example, the type of light (e.g., an arrangement of light emitting diodes (LEDs), a light bar, a projector light, etc.), the location of the light (e.g., brake light, headlight, side mirror light, etc.), the projection area of the light (e.g., ten feet in length and three feet in width from the source of the light), the brightness of the light along its projection (e.g., fifty lumens (lms) eight feet from the light source, 100 lms three feet from the light source, etc.), and so on. In one approach, the control module 320 causes the processor(s) to determine the lighting coverage information 360 based on the sensor data 340. The control module 320, in one embodiment, may cause the processor(s) 210 to determine the lighting coverage of a light by processing and analyzing the sensor data 340. For example, the processor(s) 210 may identify the lighting coverage of a light by processing and analyzing image/video data acquired by sensors of the vehicle 200/following vehicle. In one arrangement, the control module 320 causes the processor(s) to determine the lighting coverage information 360 by utilizing a lookup table that is preconfigured by an OEM when the vehicle 200 is originally provisioned and/or a lookup table that is developed based on manual inputs of a lighting supplier/authorized user of the vehicle 200/following vehicle.

In one configuration, the data store 330 further includes authorized user information 370. The authorized user information 370 is, in one embodiment, information about an authorized user of the vehicle 200/following vehicle, where the authorized user is a driver, passenger, occupant, fleet manager, renter, or is otherwise authorized to enter the vehicle 200/following vehicle. The authorized user information 370 includes, for example, the identity of the authorized user, where the identity may be entered via manual inputs and/or identified from the sensor data 340 (e.g., the control module 320 may cause the processor(s) 210 to determine that any user who drives, enters, or sits in the vehicle 200 and/or following vehicle greater than a threshold number of times is an authorized user). The authorized user information 370 further includes, for example, information associated with preferences of the authorized user, such as in which conditions the user prefers to prioritize sensor coverage versus lighting coverage when the sensor coverage and lighting coverage differ, lighting preferences of the user, contact methods for the user when the user is external to the vehicle 200/following vehicle, and other information related to the preferences of the user. The preferences of the authorized user may depend on the weather, time of day, crime rates in the area, and/or the region the vehicle 200/following vehicle is located in.

The control module 320, in one embodiment, further causes the processor(s) 210 to perform additional tasks beyond controlling the respective sensors to acquire and provide the sensor data 340. For example, the control module 320 includes instructions that cause the processor(s) 210 to control the following vehicle to park in a position that maximizes the sensor coverage and/or the lighting coverage between the vehicle 200 and the following vehicle while the vehicle 200 is stationary. For example, after the vehicle 200 is parked, the processor(s) 210 control(s) the second vehicle to park in the position that maximizes the sensor and/or lighting coverage between the vehicle 200 and the following vehicle. Where the position that maximizes the sensor coverage and the position that maximizes the lighting coverage differ, the control module 320, in one embodiment, includes instructions that cause the processor(s) 210 to determine which position to park in. In one approach, the processor(s) 210 determine which position to park in based on the authorized user information 370 and/or based on contextual information (e.g., based on weather, time of day, the surrounding area, potential for crime, etc.). In any case, the processor(s) control the following vehicle to park in the position that maximizes the sensor and/or lighting coverage.

Responsive to controlling the following vehicle to park in the position that maximizes the sensor and/or lighting coverage of the vehicle 200 and the following vehicle, the control module 320, in one embodiment, causes the processor(s) 210 to activate the sensors/lighting mechanisms of the vehicle 200 and following vehicle depending on whether the position of the following vehicle maximizes the sensor or lighting coverage. For example, if the following vehicle is in the position that maximizes the sensor coverage, the processor(s) 210 activate the sensors of the vehicle 200 and the following vehicle that provide the maximum coverage. On the other hand, if the following vehicle is in the position that maximizes the lighting coverage, the processor(s) 210 control a lighting mechanism 380 of the vehicle 200 and a lighting mechanism of the following vehicle to activate lights. For example, the lighting mechanism 380 may activate a plurality of lights of the vehicle 200, such as headlights, brake lights, projector lights, and so on. The lighting mechanism of the following vehicle may similarly activate a plurality of lights of the following vehicle.

In one or more arrangements, the extension system 270 is implemented in the following vehicle. For example, in one embodiment, the control module 320 cause the processor(s) 210 to control the vehicle 200 to park at a distance that maximizes the sensor and/or lighting coverage of the vehicle 200 and the following vehicle when the following vehicle is stationary. Further, in one or more arrangements, the extension system 270 is implemented in a lead and/or following vehicle that is part of a vehicle platoon. As an example, the extension system 270 may control a plurality of vehicles to park at distances from the vehicle 200/following vehicle to maximize sensor/lighting coverage of a vehicle platoon. In this way, the extension system 270 improves providing sensor/lighting coverage for a vehicle.

Figure 4:
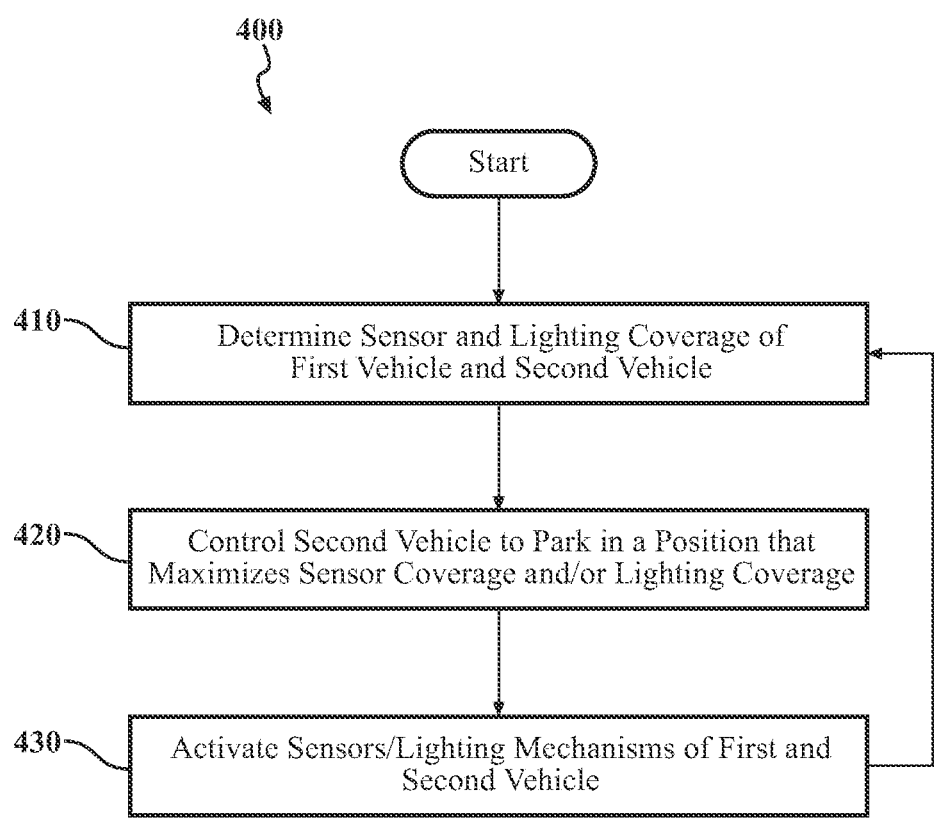
FIG. 4 illustrates one embodiment of a method that is associated with improving sensor and/or lighting coverage of a first vehicle by controlling a second vehicle.

Additional aspects of protecting a vehicle will be discussed in relation to FIG. 4. FIG. 4 illustrates a flowchart of a method 400 that is associated with enhancing sensor/lighting coverage of a first vehicle using a second vehicle. Method 400 will be discussed from the perspective of the extension system 270 of FIGS. 2 and 3. While method 400 is discussed in combination with the extension system 270, it should be appreciated that the method 400 is not limited to being implemented within the extension system 270 but is instead one example of a system that may implement the method 400. Further, while the method 400 and the extension system 270 are discussed as being implemented in the vehicle 200, it should be understood that the extension system 270 may be implemented in a following vehicle that may be similar to the vehicle 200.

At step 410, the control module 320 includes instructions that, when executed by the processor(s) 210, cause the processor(s) 210 to determine sensor and lighting coverage of the vehicle 200 and a following vehicle of the vehicle 200. As previously discussed, in one approach, the following vehicle is configured to autonomously follow the vehicle 200 in a hitchless towing configuration. In one embodiment, the processor(s) 210 determine the sensor and lighting coverage of the vehicles from the sensor coverage information 350 and the lighting coverage information 360. For example, as previously discussed the processor(s) 210 may determine the sensor/lighting coverage by analyzing a lookup table that stores the sensor coverage information 350 about each of the sensors of the vehicle 200 and the following vehicle and the lighting coverage information 360 about each of the external lights of the vehicle 200 and the following vehicle. As another example, the processer(s) 210 may determine the sensor/lighting coverage by processing and analyzing the sensor data 340 to determine the range of the sensors and the lights of the lighting mechanisms.

In any case, the control module 320 causes the processor(s) 210 to determine a scannable range of the sensors of the vehicle 200 and the following vehicle. The scannable range is, for example, the maximum area that can be covered by the sensors of the vehicle 200 and the following vehicle. For example, where the vehicle 200 has both a LiDAR sensor and a camera that sense a same general area (e.g., an area in front of the vehicle 200, behind the vehicle 200, and so on), where the LiDAR sensor has a larger scannable range than the camera, the processor(s) 210 consider the LiDAR sensor range in determining the maximum area covered by the sensors of the vehicle 200. Further, the control module 320 causes the processor(s) 210 to determine the lighting coverage of the lights of the vehicle 200 and the following vehicle, where the lighting coverage is the maximum area that can be covered by activated lights of the vehicle 200 and the following vehicle.

At step 420, the control module 320, in one approach, causes the processor(s) 210 to control the following vehicle to park in a position that maximizes the sensor coverage and/or lighting coverage between the vehicle 200 and the following vehicle while the vehicle 200 is stationary. For example, the processor(s) 210 control the following vehicle to park in response to determining that the vehicle 200 is parked. The position that maximizes the sensor coverage and/or lighting coverage is, for example, a distance between the vehicle 200 and the following vehicle that results in no overlap between sensor/lighting coverage and that provides a continuous stream of sensor/lighting coverage between the vehicles. The position may be parallel to the vehicle 200, across from the vehicle 200, and/or any other configuration that maximizes the sensor/lighting coverage. The position may further result in the following vehicle having the same orientation as the vehicle 200 or a different orientation from the vehicle 200.

In one arrangement, where the position that maximizes the sensor coverage and the lighting coverage differ, the control module 320 causes the processor(s) 210 to determine whether to control the following vehicle to park in a position that maximizes the sensor coverage or the position that maximizes the lighting coverage. The processor(s) 210, in one configuration, determine whether to control the following vehicle to park in the position that maximizes the sensor/lighting coverage based on the authorized user information 370. For example, responsive to identifying the authorized user who parked the vehicle 200, the authorized user who is present in the vehicle 200 while the vehicle is parked, and/or the authorized user who plans to use the vehicle 200 after the vehicle parks, the processor(s) 210 process the authorized user information 370 about the authorized user to determine whether the authorized user prefers for the following vehicle to be parked in a manner that maximizes sensor coverage or lighting coverage.

The preference of the authorized user may depend on the time of day, weather, region, etc. Accordingly, the processor(s) 210, in one approach, determine the time of day, weather, crime rate, and region the vehicle 200 is located by processing and analyzing the sensor data 340 about the surroundings of the vehicle 200, by downloading/accessing the weather information from a weather application programming interface (API), by downloading/accessing information about a crime rate in the vicinity of the vehicle 200/following vehicle from a server/network, and/or by processing GPS/navigation data about the vehicle 200 and following vehicle to determine the region in which the vehicles are located. In response to identifying the conditions that affect the preferences of the authorized user, the processor(s) 210 control the following vehicle to park in a manner that satisfies the preferences of the authorized user. As an example, if the authorized user prefers that the sensor coverage be maximized when the weather is sunny and the vehicles are in a high-crime rate area, the processor(s) 210 control the following vehicle to park in the position that maximizes the sensor coverage.

In one arrangement, where the authorized user information 370 does not include preferences of the user, the control module 320 causes the processor(s) 210 to determine whether to control the following vehicle to park in the position that maximizes the sensor/lighting coverage based on the surroundings of the vehicle 200. In one approach, the processor(s) 210 control the following vehicle to park in the position that maximizes lighting coverage when the visibility of the vehicle 200/following vehicle is low. For example, if the lighting and weather conditions result in the vehicle 200/following vehicle having a visibility below a threshold amount (e.g., below five lms), the processor(s) 210 control the following vehicle to park in the position that maximizes the lighting coverage. On the other hand, the processor(s) 210, in one embodiment, control the following vehicle to park in the position that maximizes the sensor coverage when the crime rate in the area is above a certain threshold (e.g., above ten percent) and/or when the visibility of the vehicle 200/following vehicle is above a threshold amount (e.g., above five lms).

In one embodiment, the control module 320 further controls the processor(s) 210 to control the following vehicle to move to the position that maximizes the lighting coverage after being in the position that maximizes the sensor coverage (or vice versa) according to changes in the surroundings of the vehicle 200/following vehicle. For example, if the processor(s) 210 determine that the visibility of the vehicle 200/following vehicle decreases below the threshold visibility amount, the processor(s) 210 may control the following vehicle to move from the position that maximizes sensor coverage to the position that maximizes lighting coverage. On the other hand, if the processor(s) 210 determine that the crime rate has increased and/or that the visibility of the vehicles has increased, the processor(s) 210 control the following vehicle to move from the position that maximizes the lighting coverage to the position that maximizes the sensor coverage.

With continued reference to step 420, in one approach, the control module 320 causes the processor(s) 210 to process and analyze the sensor data 340 about the position that maximizes the sensor/lighting coverage to determine whether it is possible for the following vehicle to park in the position that maximizes the sensor/lighting coverage. In one embodiment, the control module 320 causes the processor(s) 210 to, responsive to determining that environmental conditions prevent the following vehicle from parking in the position that maximizes the sensor/lighting coverage, control the following vehicle to park at a distance from the vehicle 200 that does not maximize the sensor coverage/lighting coverage. An environmental condition that prevents the following vehicle from parking in the position that maximizes the sensor/lighting coverage is, for example, an obstacle (e.g., a parked vehicle, pedestrian, construction cone, etc.), a weather condition (e.g., flooding, snow, leaves, etc.), and/or a parking restriction (e.g., an unauthorized parking zone, a parking time limitation, etc.). For example, if a third vehicle is parked in the position that maximizes the sensor/lighting coverage, if a snow bank covers the position that maximizes the sensor/lighting coverage, and/or if a fire hydrant is located adjacent to the position that maximizes the sensor/lighting coverage, the processor(s) 210 to park the following vehicle at a distance from the vehicle 200 that does not maximize the sensor/lighting coverage.

In one configuration, the processor(s) 210 process the sensor data 340 to identify the environmental conditions. In one approach, the control module 320 causes the processor(s) 210 to use a machine learning algorithm embedded within the control module 320 or elsewhere within the extension system 270, such as a convolutional neural network (CNN), to perform feature extraction over the sensor data 340 from which the environmental conditions are derived. Of course, in further aspects, the control module 320 may cause the processor(s) 210 to employ different machine learning algorithms or implements different approaches for performing the associated functions, which can include deep convolutional encoder-decoder architectures, or another suitable approach that generates feature extraction for the separate object classes represented in the image. Whichever particular approach the control module 320 causes the processor(s) 210 to implement, the control module 320 causes the processor(s) 210 to provide an output identifying objects represented in the sensor data 340. In this way, the control module 320 causes the processor(s) 210 to identify environmental conditions in the surroundings of the vehicle 200.

In addition to analyzing the sensor data 340 to identify the environmental conditions that prevent the following vehicle from parking in the position that maximizes the sensor/lighting coverage, the processor(s) 210, in one embodiment, receive/access information about environmental conditions associated with dangerous parking areas. For example, the processor(s) 210 may communicate with a remote server/network that includes a history of vehicle accidents in the vicinity of the vehicle 200/following vehicle. Based on the accident history, the processor(s) 210 determine(s) whether the area is associated with an environmental condition that prevents the following vehicle from parking in the position that maximizes the sensor/lighting coverage. If, for example, the position that would maximize sensor/lighting coverage is associated with a high collision rate (e.g., ten collisions per week, ten collisions per month, etc.), the processor(s) 210 determine(s) that the collision rate prevents the following vehicle from parking in the position.

In one approach, the control module 320 controls the following vehicle to park at the next closest position that maximizes the sensor/lighting coverage (i.e., the position with the least amount of sensor/lighting overlap aside from the position that maximizes the sensor/lighting coverage) in response to identifying the environmental condition that prevents the following vehicle from parking in the position that maximizes the sensor/lighting coverage from the sensor data 340. The control module 320, in one arrangement, causes the processor(s) 210 to monitor the surroundings of the vehicle 200 to determine whether the environmental condition satisfies a change threshold that is based, at least in part, on a status of the environmental condition. Accordingly, when the environmental condition satisfies the change threshold, the control module 320 causes the processor(s) 210 to control the following vehicle to park in the position that maximizes the sensor/lighting coverage. In one approach, the processor(s) 210 process and analyze the sensor data 340 to determine the status of the environmental condition. Statuses that satisfy the change threshold include, for example, a removal of the obstacle (e.g., movement of a parked vehicle/pedestrian/construction cone/other object in the position that maximizes the sensor/lighting coverage), a change in the weather condition (e.g., melting of a snow bank, removal of leaves, evaporation of a puddle, etc.), and a change in the parking restriction (e.g., an unauthorized parking zone becomes authorized, a time limitation is lifted, etc.).

In addition to analyzing the sensor data 340 of the vehicle 200/following vehicle, the processor(s) 210, in one approach, receive/access sensor data from infrastructure (e.g., security systems, building sensors, parking structure sensors, etc.) and/or surrounding vehicles via vehicle-to-vehicle (V2V) communications/vehicle-to-everything (V2X) communications. For example, a parking structure may include cameras that can capture sensor data related to the area that maximizes the sensor/lighting coverage of the vehicle 200/following vehicle, and the sensor data of the parking structure may indicate that the position that maximizes the sensor/lighting coverage of the vehicle 200/following vehicle is clear. In any case, in response to determining that the status of the environmental condition satisfies the change threshold, the processor(s) 210 control the following vehicle to park in the position that maximizes the sensor/lighting coverage.

Moreover, in one embodiment, the processor(s) 210 may process and analyze the sensor data 340 to determine whether the following vehicle should move locations based on changes in the environmental conditions. In one embodiment, the processor(s) 210 control the following vehicle to move to the next-closest position that maximizes the sensor/lighting coverage in response to changes in weather conditions, changes in parking restrictions, and/or based on the needs of other vehicles. As an example, if the processor(s) 210 determine that the following vehicle has been parked for two hours in a parking spot with a two hour time limitation, the processor(s) 210 control the following vehicle to change positions. As another example, if the processor(s) 210 determine that a first responder vehicle, school bus, or vehicle with a handicap occupant requires the use of the parking spot of the following vehicle, the processor(s) 210 control the following vehicle to change positions to the next-closest position that maximizes the sensor/lighting coverage.

With continued reference to step 420, in response to the following vehicle parking, the control module 320, in one embodiment, causes the processor(s) 210 to control the lighting mechanisms of the vehicle 200 and/or following vehicle to output an external indicator that indicates a connection between the vehicle 200 and following vehicle. The external indicator is, for example, a light/light beams projected from programmable LEDs/projectors of the vehicle 200 to the following vehicle and/or from the following vehicle to the vehicle 200, a projection onto the ground in the area between the vehicle 200 and following vehicle, and/or a display on the exterior of the vehicle 200 and/or following vehicle. The display, projection, and/or lights may output a pattern, a symbol, text, color, flash pattern, and so on that indicates a connection between the vehicle 200 and the following vehicle.

Further, in response to the following vehicle parking in the position that maximizes the sensor/lighting coverage, the control module 320, in one embodiment, causes the processor(s) 210 to notify the authorized user of the vehicle 200/following vehicle of the parking location of the vehicle 200 and the following vehicle. Further, if the position of the following vehicle changes while the authorized user is away, the notification can include the new position of the following vehicle as well as the reason for updating the position (e.g., because of weather, obstacles, etc.). The notification may be received on a personal device of the user, where the personal device is registered and stored in the authorized user information 370. The authorized user may further access the parking location information on a smartphone application (app).

At step 430, the control module 320 causes the processor(s) 210 to activate the sensors/lighting mechanisms of the vehicle 200 and following vehicle according to whether the following vehicle is parked in the position that maximizes the sensor coverage or position that maximizes the lighting coverage. As an example, if the vehicles are parked in a manner that maximizes sensor coverage, then the processor(s) 210 activate the sensors that result in the maximum sensor coverage. On the other hand, if the vehicles are parked in a manner that maximizes the lighting coverage, then the processor(s) 210 control the lighting mechanisms to activate the lights that maximize the lighting coverage. In one approach, the processor(s) 210 activate both the sensors and the lighting coverage regardless of the position of the vehicles.

In one embodiment, the processor(s) 210 activate low resolution sensors of the vehicle 200 and the following vehicle to conserve energy of the sensors until the processor(s) 210 identify a trigger. The trigger is, for example, motion in the vicinity of the vehicle 200/following vehicle, the identification of an unauthorized party within the vicinity of the vehicle 200/following vehicle, and so on. In response to identifying the trigger in the surroundings of the vehicle 200/following vehicle, the processor(s) 210 activate high resolution sensors of the vehicle 200/following vehicle. In this way, the processor(s) 210 preserve energy of the vehicle 200/following vehicle by only activating the high resolution sensors when relevant triggers are present in the surroundings of the vehicles.

Regardless of the sensors that are activated, the processor(s) 210, in one embodiment, notify the authorized user of changes in environmental conditions in the surroundings of the vehicle 200/following vehicle that occur while the authorized user is away from the vehicle 200/following vehicle. Changes include, for example, changes in weather conditions (e.g., the formation of puddles, the formation of ice, and so on around the vehicle 200/following vehicle). The processor(s) 210 may communicate the notification to the personal device of the authorized user, via a smartphone app of the authorized user, and/or via any other communication method preferred by the authorized user (as determined by the authorized user information 370) and may include an image/video associated with the change, a time the change occurred at, instructions to avoid safety conditions associated with the change (e.g., navigation instructions that maneuver the authorized user around the environmental condition), and other relevant information associated with the change in environmental conditions.

In regards to activating the lighting mechanism of the vehicle 200/following vehicle, the control module 320, in one approach, causes the processor(s) 210 to activate the lighting mechanism of the vehicle 200/following vehicle in response to determining that the authorized user of the vehicle 200/following vehicle satisfies a proximity threshold that is based, at least in part, on a distance from the authorized user to the vehicle 200/the second vehicle. In one approach, the distance that satisfies the proximity threshold is the distance from the authorized user to the vehicle 200/following vehicle that results in the vehicle 200/following vehicle being within a viewable range of the authorized user (e.g., ten feet, twenty feet, etc.). In one embodiment, the processor(s) 210 determine the distance from the authorized user to the vehicle 200/following vehicle by analyzing sensor data captured by ultra-wideband (UWB) sensors associated with a personal device of the authorized user, by analyzing sensor data associated with a GPS location of the authorized user in relation to the vehicle 200/following, and/or by analyzing image/video data captured by the vehicle sensors that identify the authorized user (e.g., where the processor(s) 210 can identify the authorized user based on the gait and/or appearance of the authorized user). Further, in one approach, the authorized user can command the vehicle 200/following vehicle to activate the lighting mechanisms from the personal device of the authorized user (e.g., via a smartphone app). In this way, the extension system 270 improves providing additional sensor and/or lighting coverage for a vehicle. Discussion will now turn to FIG. 5 to further explain how the extension system 270 controls a following vehicle to maximize the sensor/lighting coverage between a lead vehicle and the following vehicle.

Figure 5:
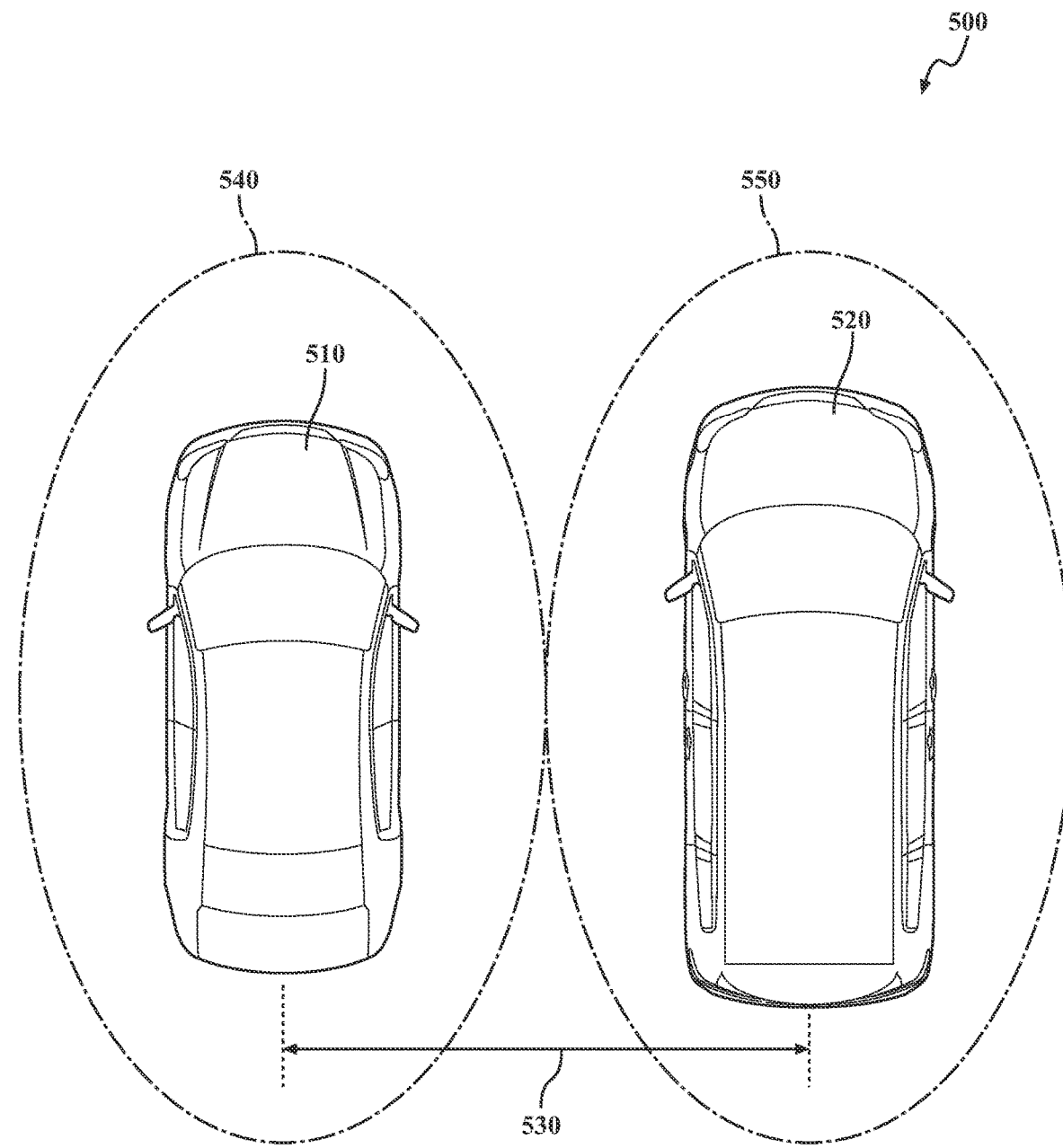
FIG. 5 shows an illustrative example of a first vehicle and a second vehicle that are parked at a distance that maximizes sensor and/or lighting coverage of the vehicles.
Figure 6:
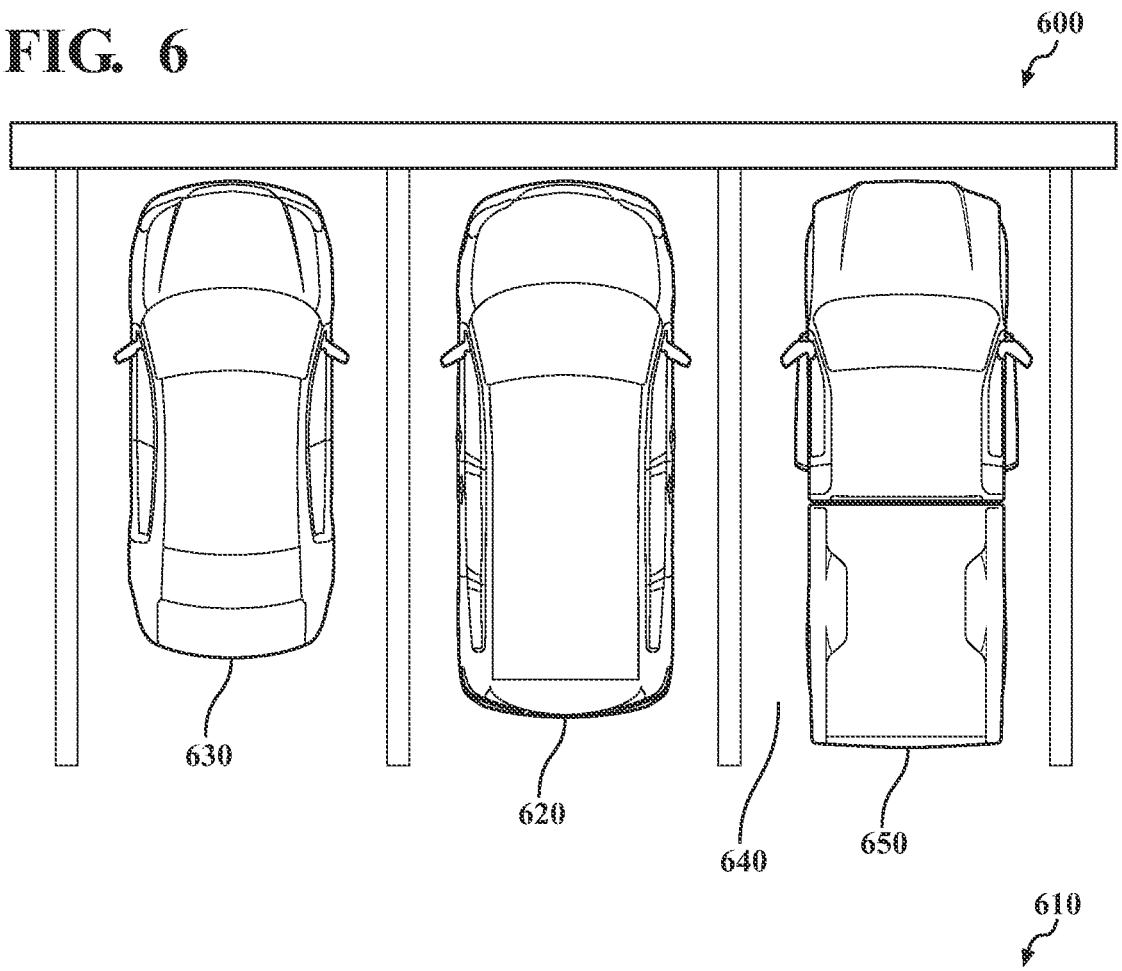
FIG. 6 illustrates a sequence associated with a second vehicle readjusting parking positions in response to an environmental condition satisfying a change threshold.
Figure 6:
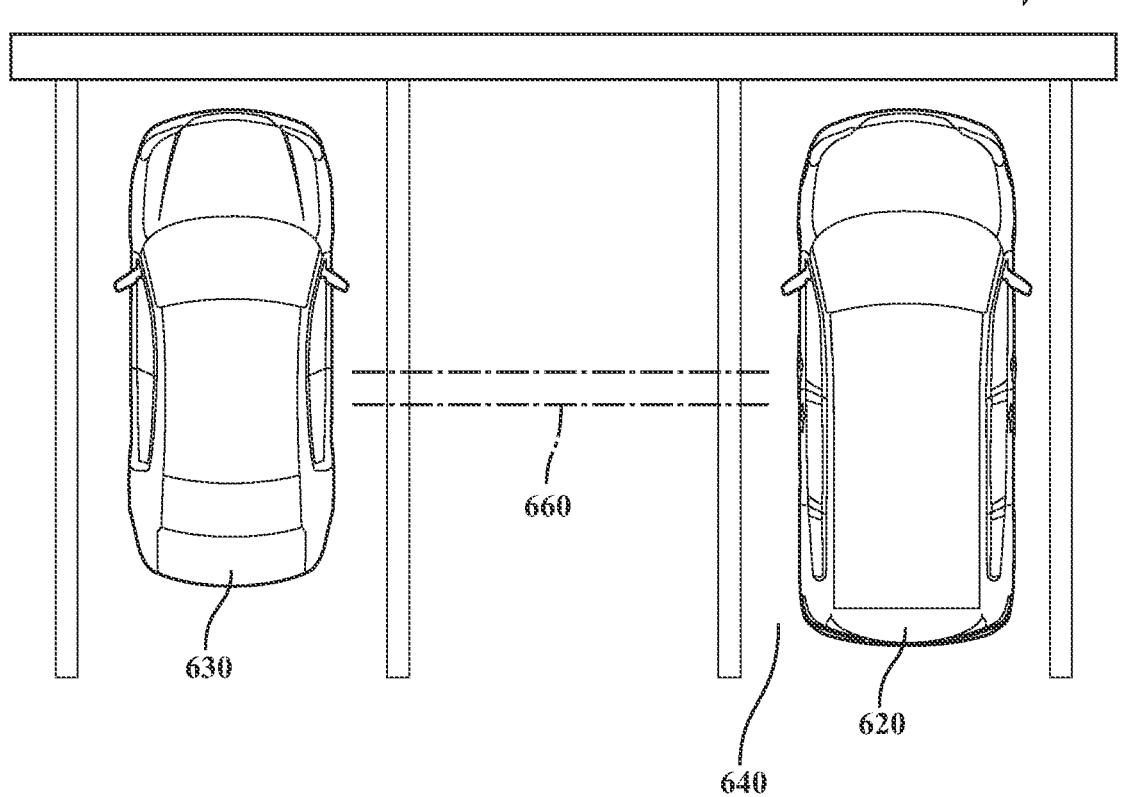

With reference to FIGS. 5-6, the terms "first vehicle" and "second vehicle" refer to a lead vehicle and following vehicle in a hitchless towing configuration as discussed in relation to FIG. 1, respectively. FIGS. 5-6 will be discussed from the perspective of the extension system 270 of FIGS. 2 and 3. Referring to FIG. 5, one embodiment of an environment 500 that includes a first vehicle 510 and a second vehicle 520 parked at a distance 530 that maximizes sensor/lighting coverage of the vehicles is shown. The first vehicle 510 includes a first vehicle sensor/lighting coverage 540 that represents the area covered by sensors/lights of the first vehicle 510. The second vehicle 520 includes a second vehicle sensor/lighting coverage 550 that represents the area covered by sensors/lights of the second vehicle 520. As previously discussed, the control module 320, in one embodiment, causes the processor(s) 210 to determine the first vehicle sensor/lighting coverage 540 and the second vehicle sensor/lighting coverage 550. In response to determining the first vehicle sensor/lighting coverage 540 and the second vehicle sensor/lighting coverage 550, the processor(s) 210 control the second vehicle 520 to park at the distance 530. As illustrated in FIG. 5, the distance 530 results in no overlap between the first vehicle sensor/lighting coverage 540 and the second vehicle sensor/lighting coverage 550. Discussion will now turn to FIG. 6 to further explain how the extension system 270 adjusts the position of a following vehicle according to changes in environmental conditions.

Referring to FIG. 6, a time sequence representing a second vehicle readjusting parking positions in response to an environmental condition satisfying a change threshold is illustrated. At timestep 600 a second vehicle 620 is parked in a position that does not maximize sensor/lighting coverage between the second vehicle 620 and a first vehicle 630. Rather, as illustrated an obstacle 650 is occupying a position 640 that maximizes the sensor/lighting coverage of the first vehicle 630 an the second vehicle 620. At timestep 610, responsive to identifying that the obstacle 650 has moved from the position 640 that maximizes the sensor/lighting coverage, the processor(s) 210 control the second vehicle 620 to move to the position 640 that maximizes the sensor/lighting coverage. Further, in response to the second vehicle 620 parking in the position 640 that maximizes the sensor/lighting coverage, the processor(s) 210 output lights from the first vehicle 630 and the second vehicle 620 to form a connectivity indication 660 that is visible by other road users.

FIG. 2 will now be discussed in full detail as an example environment within which the system and methods disclosed herein may operate. In some instances, the vehicle 200 is configured to switch selectively between different modes of operation/control according to the direction of one or more modules/systems of the vehicle 200. In one approach, the modes include: 0, no automation; 1, driver assistance; 2, partial automation; 3, conditional automation; 4, high automation; and 5, full automation. In one or more arrangements, the vehicle 200 can be configured to operate in only a subset of possible modes.

In one or more embodiments, the vehicle 200 is an autonomous vehicle. As used herein, "autonomous vehicle" refers to a vehicle that is capable of operating in an autonomous mode (e.g., category 5, full automation). "Autonomous mode" refers to navigating and/or maneuvering the vehicle 200 along a travel route using one or more computing systems to control the vehicle 200 with minimal or no input from a human driver. In one or more embodiments, the vehicle 200 is either highly automated or completely automated. In one embodiment, the vehicle 200 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 200 along a travel route.

The vehicle 200 can include one or more processor(s) 210. In one or more arrangements, the processor(s) 210 can be a main processor of the vehicle 200. For instance, the processor(s) 210 can be an electronic control unit (ECU), and application specific integrated circuit (ASIC), a microprocessor, etc. The vehicle 200 can include one or more data store(s) 215 for storing one or more types of data. The data store(s) 215 can include volatile and/or non-volatile memory. Examples of data store(s) 215 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, and hard drives. The data store(s) 215 can be a component of the processor(s) 210, or the data store(s) 215 can be operatively connected to the processor(s) 210 for use thereby. The term "operatively connected," as used throughout this description, can include direct or indirect connections, including connections without direct physical contact.

In one or more arrangements, the one or more data store(s) 215 can include map data 216. The map data 216 can include maps of one or more geographic areas. In some instances, the map data 216 can include information or data on roads, traffic control devices, road markings, structures, features, and/or landmarks in the one or more geographic areas. The map data 216 can be in any suitable form. In some instances, the map data 216 can include aerial views of an area. In some instances, the map data 216 can include ground views of an area, including 360-degree ground views. The map data 216 can include measurements, dimensions, distances, and/or information for one or more items included in the map data 216 and/or relative to other items included in the map data 216. The map data 216 can include a digital map with information about road geometry.

In one or more arrangements, the map data 216 can include one or more terrain map(s) 217. The terrain map(s) 217 can include information about the terrain, roads, surfaces, and/or other features of one or more geographic areas. The terrain map(s) 217 can include elevation data in the one or more geographic areas. The terrain map(s) 217 can define one or more ground surfaces, which can include paved roads, unpaved roads, land, and other things that define a ground surface.

In one or more arrangements, the map data 216 can include one or more static obstacle map(s) 218. The static obstacle map(s) 218 can include information about one or more static obstacles located within one or more geographic areas. A "static obstacle" is a physical object whose position does not change or substantially change over a period of time and/or whose size does not change or substantially change over a period of time. Examples of static obstacles can include trees, buildings, curbs, fences, railings, medians, utility poles, statues, monuments, signs, benches, furniture, mailboxes, large rocks, hills. The static obstacles can be objects that extend above ground level. The one or more static obstacles included in the static obstacle map(s) 218 can have location data, size data, dimension data, material data, and/or other data associated with it. The static obstacle map(s) 218 can include measurements, dimensions, distances, and/or information for one or more static obstacles. The static obstacle map(s) 218 can be high quality and/or highly detailed. The static obstacle map(s) 218 can be updated to reflect changes within a mapped area.

The one or more data store(s) 215 can include sensor data 219. In this context, "sensor data" means any information about the sensors that the vehicle 200 is equipped with, including the capabilities and other information about such sensors. As will be explained below, the vehicle 200 can include the sensor system 220. The sensor data 219 can relate to one or more sensors of the sensor system 220. As an example, in one or more arrangements, the sensor data 219 can include information about one or more LIDAR sensor(s) 224 of the sensor system 220.

In some instances, at least a portion of the map data 216 and/or the sensor data 219 can be located in one or more data store(s) 215 located onboard the vehicle 200. Alternatively, or in addition, at least a portion of the map data 216 and/or the sensor data 219 can be located in one or more data stores 215 that are located remotely from the vehicle 200.

As noted above, the vehicle 200 can include the sensor system 220. The sensor system 220 can include one or more sensors. "Sensor" means a device that can detect, and/or sense something. In at least one embodiment, the one or more sensors detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 220 includes a plurality of sensors, the sensors may function independently or two or more of the sensors may function in combination. The sensor system 220 and/or the one or more sensors can be operatively connected to the processor(s) 210, the data store(s) 215, and/or another element of the vehicle 200. The sensor system 220 can produce observations about a portion of the environment of the vehicle 200 (e.g., nearby vehicles).

The sensor system 220 can include any suitable type of sensor. Various examples of different types of sensors will be described herein. However, it will be understood that the embodiments are not limited to the particular sensors described. The sensor system 220 can include one or more vehicle sensor(s) 221. The vehicle sensor(s) 221 can detect information about the vehicle 200 itself. In one or more arrangements, the vehicle sensor(s) 221 can be configured to detect position and orientation changes of the vehicle 200, such as, for example, based on inertial acceleration. In one or more arrangements, the vehicle sensor(s) 221 can include one or more accelerometers, one or more gyroscopes, an inertial measurement unit (IMU), a dead-reckoning system, a global navigation satellite system (GNSS), a global positioning system (GPS), a navigation system 247, and/or other suitable sensors. The vehicle sensor(s) 221 can be configured to detect one or more characteristics of the vehicle 200 and/or a manner in which the vehicle 200 is operating. In one or more arrangements, the vehicle sensor(s) 221 can include a speedometer to determine a current speed of the vehicle 200.

Alternatively, or in addition, the sensor system 220 can include one or more environment sensors 222 configured to acquire data about an environment surrounding the vehicle 200 in which the vehicle 200 is operating. "Surrounding environment data" includes data about the external environment in which the vehicle is located or one or more portions thereof. For example, the one or more environment sensors 222 can be configured to sense obstacles in at least a portion of the external environment of the vehicle 200 and/or data about such obstacles. Such obstacles may be stationary objects and/or dynamic objects. The one or more environment sensors 222 can be configured to detect other things in the external environment of the vehicle 200, such as, for example, lane markers, signs, traffic lights, traffic signs, lane lines, crosswalks, curbs proximate the vehicle 200, off-road objects, etc.

Various examples of sensors of the sensor system 220 will be described herein. The example sensors may be part of the one or more environment sensors 222 and/or the one or more vehicle sensor(s) 221. However, it will be understood that the embodiments are not limited to the particular sensors described.

As an example, in one or more arrangements, the sensor system 220 can include one or more of each of the following: radar sensor(s) 223, LIDAR sensor(s) 224, sonar sensors 225, weather sensors, haptic sensors, locational sensors, and/or one or more cameras 226. In one or more arrangements, the one or more cameras 226 can be high dynamic range (HDR) cameras, stereo or infrared (IR) cameras.

The vehicle 200 can include an input system 230. An "input system" includes components or arrangement or groups thereof that enable various entities to enter data into a machine. The input system 230 can receive an input from a vehicle occupant. The vehicle 200 can include an output system 235. An "output system" includes one or more components that facilitate presenting data to a vehicle occupant.

The vehicle 200 can include one or more vehicle systems 240. Various examples of the one or more vehicle systems 240 are shown in FIG. 2. However, the vehicle 200 can include more, fewer, or different vehicle systems. It should be appreciated that although particular vehicle systems are separately defined, each or any of the systems or portions thereof may be otherwise combined or segregated via hardware and/or software within the vehicle 200. The vehicle 200 can include a propulsion system 241, a braking system 242, a steering system 243, throttle system 244, a transmission system 245, a signaling system 246, and/or a navigation system 247. Each of these systems can include one or more devices, components, and/or a combination thereof, now known or later developed.

The navigation system 247 can include one or more devices, applications, and/or combinations thereof, now known or later developed, configured to determine the geographic location of the vehicle 200 and/or to determine a travel route for the vehicle 200. The navigation system 247 can include one or more mapping applications to determine a travel route for the vehicle 200. The navigation system 247 can include a global positioning system, a local positioning system or a geolocation system.

The processor(s) 210, the extension system 270, and/or the autonomous driving system 260 can be operatively connected to communicate with the vehicle systems 240 and/or individual components thereof. For example, returning to FIG. 2, the processor(s) 210 and/or the autonomous driving system 260 can be in communication to send and/or receive information from the vehicle systems 240 to control the movement of the vehicle 200. The processor(s) 210, the extension system 270, and/or the autonomous driving system 260 may control some or all of the vehicle systems 240 and, thus, may be partially or fully autonomous as defined by SAE 0 to 5.

The processor(s) 210, the extension system 270, and/or the autonomous driving system 260 can be operatively connected to communicate with the vehicle systems 240 and/or individual components thereof. For example, returning to FIG. 2, the processor(s) 210, the extension system 270, and/or the autonomous driving system 260 can be in communication to send and/or receive information from the vehicle systems 240 to control the movement. of the vehicle 200. The processor(s) 210, the extension system 270, and/or the autonomous driving system 260 may control some or all of the vehicle systems 240.

The processor(s) 210, the extension system 270, and/or the autonomous driving system 260 may be operable to control the navigation and maneuvering of the vehicle 200 by controlling one or more of the vehicle systems 240 and/or components thereof. For instance, when operating in an autonomous mode, the processor(s) 210, the extension system 270, and/or the autonomous driving system 260 can control the direction and/or speed of the vehicle 200. The processor(s) 210, the extension system 270, and/or the autonomous driving system 260 can cause the vehicle 200 to accelerate, decelerate ( ) and/or change direction. As used herein, "cause" or "causing" means to make, force, compel, direct, command, instruct, and/or enable an event or action to occur or at least be in a state where such event or action may occur, either in a direct or indirect manner.

The vehicle 200 can include one or more actuators 250. The actuators 250 can be element or combination of elements operable to alter one or more of the vehicle systems 240 or components thereof to responsive to receiving signals or other inputs from the processor(s) 210 and/or the autonomous driving system 260. For instance, the one or more actuators 250 can include motors, pneumatic actuators, hydraulic pistons, relays, solenoids, and/or piezoelectric actuators, just to name a few possibilities.

The vehicle 200 can include one or more modules, at least some of which are described herein. The modules can be implemented as computer-readable program code that, when executed by a processor(s) 210, implements one or more of the various processes described herein. One or more of the modules can be a component of the processor(s) 210, or one or more of the modules can be executed on and/or distributed among other processing systems to which the processor(s) 210 is operatively connected. The modules can include instructions (e.g., program logic) executable by one or more processor(s) 210. Alternatively, or in addition, one or more data store(s) 215 may contain such instructions.

In one or more arrangements, one or more of the modules described herein can include artificial intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 200 can include an autonomous driving system 260. The autonomous driving system 260 can be configured to receive data from the sensor system 220 and/or any other type of system capable of capturing information relating to the vehicle 200 and/or the external environment of the vehicle 200. In one or more arrangements, the autonomous driving system 260 can use such data to generate one or more driving scene models. The autonomous driving system 260 can determine position and velocity of the vehicle 200. The autonomous driving system 260 can determine the location of obstacles, obstacles, or other environmental features including traffic signs, trees, shrubs, neighboring vehicles, pedestrians, etc.

The autonomous driving system 260 can be configured to receive, and/or determine location information for obstacles within the external environment of the vehicle 200 for use by the processor(s) 210, and/or one or more of the modules described herein to estimate position and orientation of the vehicle 200, vehicle position in global coordinates based on signals from a plurality of satellites, or any other data and/or signals that could be used to determine the current state of the vehicle 200 or determine the position of the vehicle 200 with respect to its environment for use in either creating a map or determining the position of the vehicle 200 in respect to map data.

The autonomous driving system 260 either independently or in combination with the extension system 270 can be configured to determine travel path(s), current autonomous driving maneuvers for the vehicle 200, future autonomous driving maneuvers and/or modifications to current autonomous driving maneuvers based on data acquired by the sensor system 220, driving scene models, and/or data from any other suitable source such as determinations from the sensor data 340 as implemented by the control module 320. "Driving maneuver" means one or more actions that affect the movement of a vehicle. Examples of driving maneuvers include accelerating, decelerating, braking, turning, moving in a lateral direction of the vehicle 200, changing travel lanes, merging into a travel lane, and/or reversing, just to name a few possibilities. The autonomous driving system 260 can be configured can be configured to implement determined driving maneuvers. The autonomous driving system 260 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving system 260 can be configured to execute various vehicle functions and/or to transmit data to, receive data from, interact with, and/or control the vehicle 200 or one or more systems thereof (e.g., one or more of vehicle systems 240).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-8, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, modules as used herein include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A system comprising:
a processor; and
a memory in communication with the processor and having a control module, the control module having instructions that, when executed by the processor, cause the processor to:
determine at least one of a sensor coverage and a lighting coverage of a first vehicle and a second vehicle;
control the second vehicle to park in a position that maximizes the at least one of the sensor coverage and the lighting coverage between the first vehicle and the second vehicle while the first vehicle is stationary; and
activate at least one of sensors and lighting mechanisms of the first vehicle and the second vehicle.

2. The system of claim 1, wherein the second vehicle is configured to autonomously follow the first vehicle.

3. The system of claim 1, wherein the instructions to activate the lighting mechanisms further include instructions that, when executed by the processor, cause the processor to activate the lighting mechanisms in response to determining that an authorized user of at least one of the first vehicle and the second vehicle satisfies a proximity threshold that is based, at least in part on a distance from the authorized user to the at least one of the first vehicle and the second vehicle.

4. The system of claim 1, further including instructions that, when executed by the processor, cause the processor to:
responsive to determining that environmental conditions prevent the second vehicle from parking in the position that maximizes the at least one of the sensor coverage and the lighting coverage, control the second vehicle to park at a distance from the first vehicle that does not maximize the at least one of the sensor coverage and the lighting coverage,
wherein the environmental conditions include at least one of: an obstacle,
a weather condition, and a parking restriction.

5. The system of claim 4, further including instructions that, when executed by the processor, cause the processor to:
responsive to determining that the environmental conditions satisfy a change threshold that is based, at least in part, on a status of the environmental conditions, control the second vehicle to park in the position that maximizes the at least one of the sensor coverage and the lighting coverage,
wherein the status is at least one of: a removal of the obstacle, a change in the weather condition, and a change in the parking restriction.

6. The system of claim 1, wherein the instructions to activate the sensors further include instructions that, when executed by the processor, cause the processor to:
activate a set of low resolution sensors; and
responsive to identifying a trigger in surroundings of the first vehicle and the second vehicle, activate a set of high resolution sensors.

7. The system of claim 1, wherein the instructions further include instructions that, when executed by the processor, cause the processor to:
monitor surroundings of the first vehicle and the second vehicle using the sensors; and
notify an authorized user of the at least one of the first vehicle and the second vehicle about a change in environmental conditions in the surroundings of the first vehicle and the second vehicle before the authorized user enters the at least one of the first vehicle and the second vehicle.

8. The system of claim 1, wherein the instructions further includes instructions that, when executed by the processor, cause the processor to control an external indicator of the first vehicle and the second vehicle to output an indication of a connection between the first vehicle and the second vehicle.

9. A non-transitory computer-readable medium including instructions that, when executed by a processor, cause the processor to:
determine at least one of a sensor coverage and a lighting coverage of a first vehicle and a second vehicle;
control the second vehicle to park in a position that maximizes the at least one of the sensor coverage and the lighting coverage between the first vehicle and the second vehicle while the first vehicle is stationary; and
activate at least one of sensors and lighting mechanisms of the first vehicle and the second vehicle.

10. The non-transitory computer-readable medium of claim 9, wherein the second vehicle is configured to autonomously follow the first vehicle.

11. The non-transitory computer-readable medium of claim 9, further including instructions that, when executed by the processor, cause the processor to:
responsive to determining that environmental conditions prevent the second vehicle from parking in the position that maximizes the at least one of the sensor coverage and the lighting coverage, control the second vehicle to park at a distance from the first vehicle that does not maximize the at least one of the sensor coverage and the lighting coverage,
wherein the environmental conditions include at least one of: an obstacle, a weather condition, and a parking restriction.

12. The non-transitory computer-readable medium of claim 11, further including instructions that, when executed by the processor, cause the processor to:
responsive to determining that the environmental conditions satisfy a change threshold that is based, at least in part, on a status of the environmental conditions, control the second vehicle to park in the position that maximizes the at least one of the sensor coverage and the lighting coverage,
wherein the status is at least one of: a removal of the obstacle, a change in the weather condition, and a change in the parking restriction.

13. The non-transitory computer-readable medium of claim 9, further including instructions that, when executed by the processor, cause the processor to:
monitor surroundings of the first vehicle and the second vehicle using the sensors; and
notify an authorized user of the at least one of the first vehicle and the second vehicle about a change in environmental conditions in the surroundings of the first vehicle and the second vehicle before the authorized user enters the at least one of the first vehicle and the second vehicle.

14. A method, comprising:
determining at least one of a sensor coverage and a lighting coverage of a first vehicle and a second vehicle;
controlling the second vehicle to park in a position that maximizes the at least one of the sensor coverage and the lighting coverage between the first vehicle and the second vehicle while the first vehicle is stationary; and
activating at least one of sensors and lighting mechanisms of the first vehicle and the second vehicle.

15. The method of claim 14, wherein the second vehicle is configured to autonomously follow the first vehicle.

16. The method of claim 14, wherein activating the lighting mechanisms includes activating the lighting mechanisms in response to determining that an authorized user of at least one of the first vehicle and the second vehicle satisfies a proximity threshold that is based, at least in part on a distance from the authorized user to the at least one of the first vehicle and the second vehicle.

17. The method of claim 14, further comprising:
in response to determining that environmental conditions prevent the second vehicle from parking in the position that maximizes the at least one of the sensor coverage and the lighting coverage, controlling the second vehicle to park at a distance from the first vehicle that does not maximize the at least one of the sensor coverage and the lighting coverage,
wherein the environmental conditions include at least one of: an obstacle,
a weather condition, and a parking restriction.

18. The method of claim 17, further comprising:
in response to determining that the environmental conditions satisfy a change threshold that is based, at least in part, on a status of the environmental conditions, controlling the second vehicle to park in the position that maximizes the at least one of the sensor coverage and the lighting coverage,
wherein the status is at least one of: a removal of the obstacle, a change in the weather condition, and a change in the parking restriction.

19. The method of claim 14, wherein activating the sensors includes:
- activating a set of low resolution sensors; and
- in response to identifying a trigger in surroundings of the first vehicle and the second vehicle, activating a set of high resolution sensors.

20. The method of claim 14, further comprising:
- monitoring surroundings of the first vehicle and the second vehicle using the sensors; and
- notifying an authorized user of the at least one of the first vehicle and the second vehicle about a change in environmental conditions in the surroundings of the first vehicle and the second vehicle before the authorized user enters the at least one of the first vehicle and the second vehicle.

* * * * *